United States Patent [19]

Ito

[11] 3,709,067
[45] Jan. 9, 1973

[54] HYDRAULIC CONTROL SYSTEM FOR TRANSMISSIONS

[75] Inventor: Shin Ito, Toyota, Japan

[73] Assignee: Toyota Jidosha Kogyo Kabushiki Kaisha, Aichi-ken, Japan

[22] Filed: Feb. 10, 1971

[21] Appl. No.: 114,179

[30] Foreign Application Priority Data

Feb. 12, 1970 Japan ........................... 45/11479

[52] U.S. Cl. ..................74/869, 74/864, 74/346, 74/364
[51] Int. Cl. ......... B60k 21/00, F16h 3/22, F16h 3/08
[58] Field of Search ......... 74/869, 867, 868, 863-865

[56] References Cited

UNITED STATES PATENTS

| | | | |
|---|---|---|---|
| 3,225,619 | 12/1965 | Schaefer | 74/868 |
| 3,258,984 | 7/1966 | Searles | 74/869 X |
| 3,572,179 | 3/1971 | Akima et al. | 74/869 |
| 3,587,354 | 6/1971 | Oguma | 74/868 |

*Primary Examiner*—Arthur T. McKeon
*Attorney*—John J. McGlew and Alfred E. Page

[57] ABSTRACT

The hydraulic control system is applied to transmissions in which the high speed range is obtained by supplying oil to a first one of at least two hydraulic servos and discharging oil from a second hydraulic servo. The low speed range is obtained by discharging oil from the first hydraulic servo and supplying oil to the second hydraulic servo. This hydraulic control system comprises a hydraulic pressure source, a pressure regulator value, a governor valve, a throttle valve and first and second shift valves. The hydraulic control pressure supplied from the hydraulic pressure source and regulated by the pressure regulator valve is directed through the first shift valve to the first hydraulic servo and is also directed through the second shift valve to the second hydraulic servo. The governor pressure developed by the governor valve, which conforms to the vehicle velocity, and the throttle pressure developed by the throttle valve, which conforms to the engine output, are applied to the first shift valve. The throttle pressure, moreover, actuates the second shift valve. In addition, the hydraulic pressure of the first hydraulic servo is applied to the second shift valve to oppose the throttle pressure. Thus, the oil discharge starting time of the second hydraulic servo at the time of upshift is delayed in accordance with the hydraulic pressure that is supplied to the first hydraulic servo. The degree of the time delay also is changed in accordance with the magnitude of the throttle pressure. The second shift valve forms a variable capacity accumulator chamber at the point at which the hydraulic pressure is applied from the first hydraulic servo. An orifice for reducing the rate of hydraulic pressure increase at the time oil is supplied to the first hydraulic servo as well as a check valve for enhancing the rate of hydraulic pressure decrease at the time oil is discharged from the first hydraulic servo are provided in an oil passage between the accumulator chamber and the first shift valve. By virtue of the orifice and the check valve, the gradient of the pressure change due to the oil supplied to the first hydraulic servo at the time of upshift is reduced. The degree of this gradient reduction changes to conform to the magnitude of the throttle pressure. Furthermore, at the time of downshift, the second shift valve is operated in response to the oil discharge from the first hydraulic servo so supply oil to the second hydraulic servo, and therefore the downshift oil supply starting time is reduced in accordance with the oil discharged from the first hydraulic servo as well as the magnitude of the throttle pressure.

9 Claims, 11 Drawing Figures

FIG. I
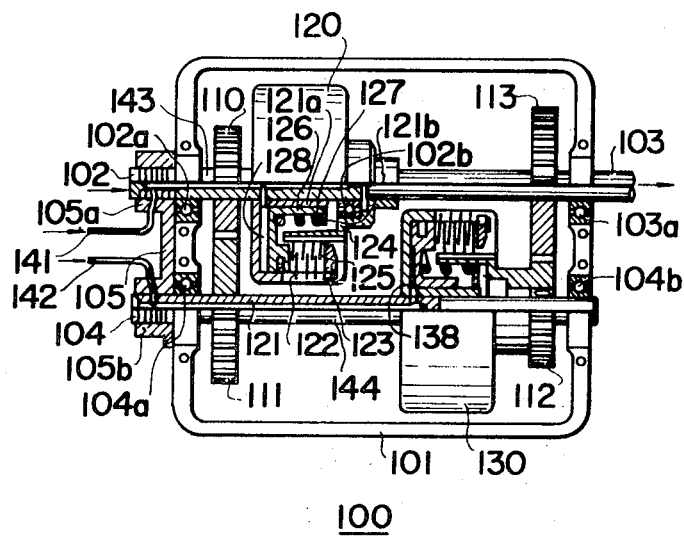
FIG. II
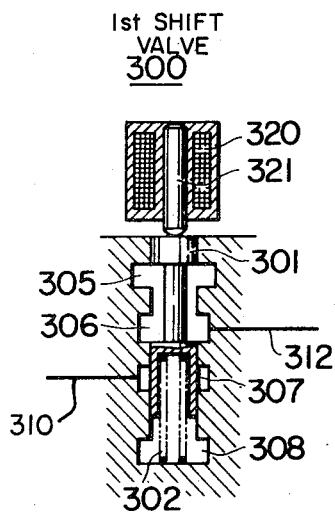
INVENTOR
SHIN ITO
BY McGlew + Tuttle
ATTORNEY

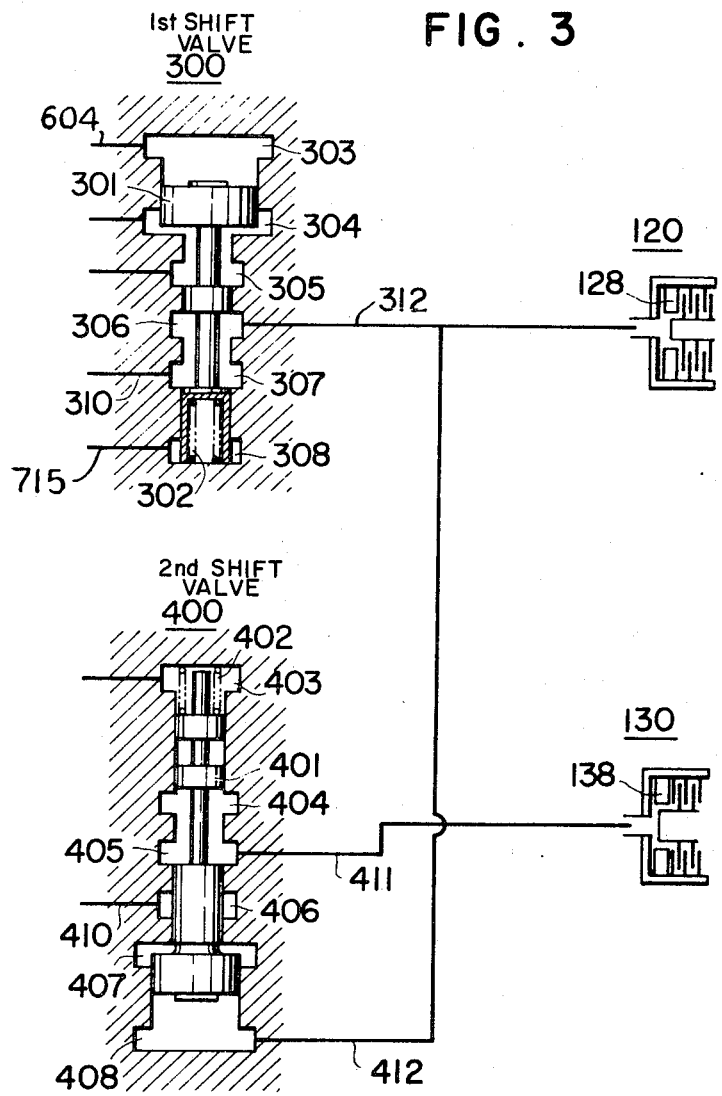

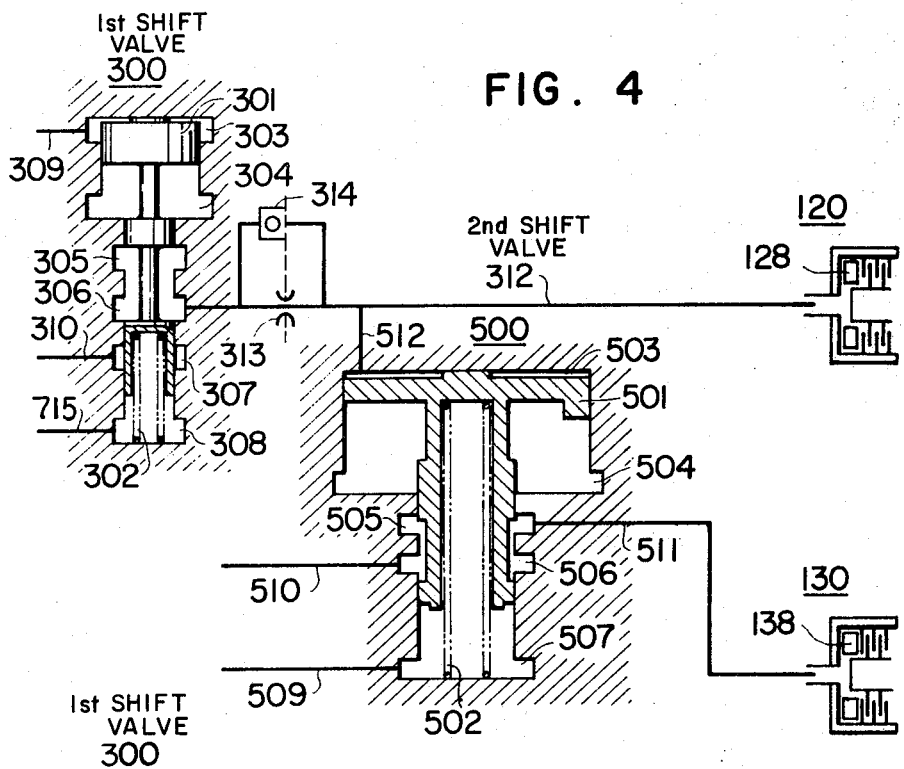
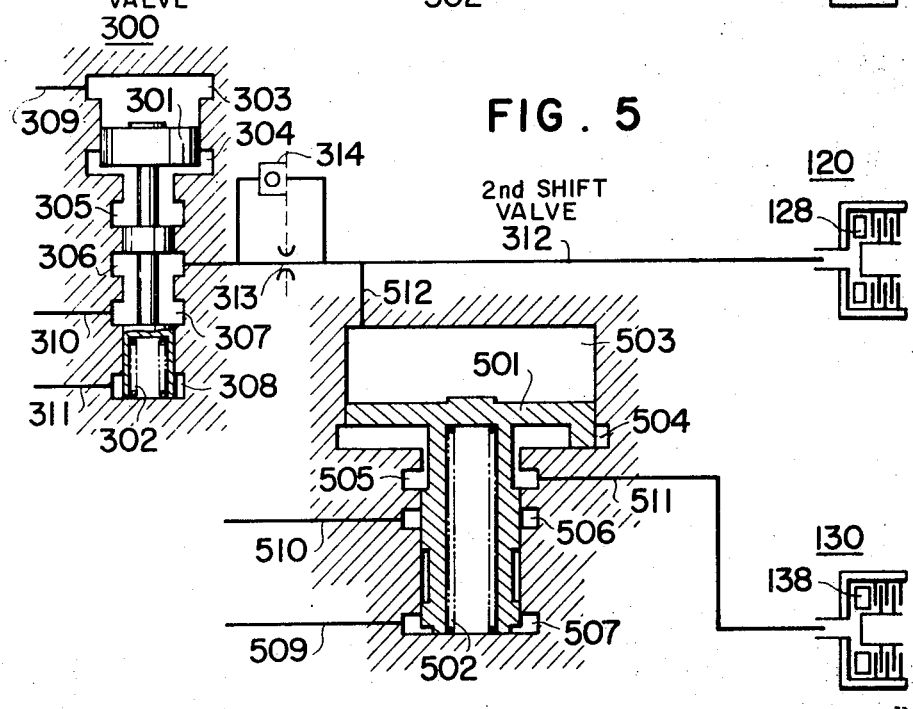

HYDRAULIC CONTROL SYSTEM FOR TRANSMISSIONS

BACKGROUND OF THE INVENTION

This invention relates to a hydraulic control system for vehicle transmissions, such as automobiles, which consist of a variable ratio speed change gear, at least two friction engaging members for shifting the speed change gear and hydraulic servos for operating the members, and the like.

In this type of transmission, a plurality of shift valves are provided in order to supply operating hydraulic oil to or discharge it from the hydraulic servos. In the case of an automatic transmission, these shift valves are controlled by a signal that is proportional to the vehicle velocity and another signal that is proportional to the throttle opening. In the case of a semiautomatic transmission, these shift valves are indirectly opened or shut off through a manual change-over by a vehicle driver or by some other means.

At a time of the so-called upshift, where the speed change gear is shifted from the driving condition at a large speed change ratio to a small speed change ratio, the rotating member at the engine side must be connected through the friction engaging member such (as a friction clutch, a friction brake, or the like) to the rotating member at the driven side, which is rotating at a lower speed. In this case, the speed of the engine side rotating member should match or conform to the lower rotational speed of the driven side member in order to provide smooth speed shifting and to reduce wear on the friction members of the friction engaging members. To establish this condition, the engine speed must be appropriately reduced.

In automatic transmissions, or in semi-automatic transmissions, however, it is impossible or quite difficult to reduce the engine speed manually. The system itself should be capable of controlling the supply or discharge of oil for the hydraulic servos that is required for the operation of the friction engaging members.

In order to discharge oil from the hydraulic servo of the friction engaging member that forms the low speed range with a large speed change ratio, and to supply oil to the hydraulic servo of the friction engaging member that forms the high speed range with a small speed change ratio, at the time of upshift the prior art systems directly apply operating hydraulic pressure developed through the upshift valve to two hydraulic servos. The decrease in hydraulic pressure at the hydraulic servo from which oil is discharged is accomplished rapidly at this initial stage. On the other hand, the increase in the hydraulic pressure at the hydraulic servo to which the oil is supplied is not initially significant due to the increase in the capacity of the hydraulic pressure chamber that results from the movement of the servo piston. This leads to a time delay during which the engine is to a no-load condition. At this time after the friction engaging member for low speed driving is released, and the friction engaging member for high speed driving becomes fully engaged. Thus, an acceleration that corresponds to the throttle opening at that time is established and the slip amount at the high speed driving friction engaging member is further increased. This causes large shocks when shifting.

If an adequate increase in the hydraulic pressure in the hydraulic servo receiving the oil supply is not made before the hydraulic pressure is decreased in the hydraulic servo from which oil is being discharged, the shifting time is prolonged and the friction members of the friction engaging members are subjected to prolonged wear.

It will be understood from the above-described facts that a situation occurs in which it is required that both friction engaging members are involved in slip driving for a certain period of time. During this time, the rotating member at the engine, through one of the friction engaging members, accelerates the driven side rotating member. The excessive torque that is included in the accelerating torque is returned to the engine side rotating member through the other friction engaging member. The value of the torque that is returned to the engine side rotating member is decreased in accordance with the speed change at the time of upshift, and therefore the returned torque does not have a value that obstructs the speed reduction process of the engine side rotating member.

SUMMARY OF THE INVENTION

An object of this invention is to provide a hydraulic control system for such transmissions wherein a speed change gear is upshifted from low speed driving to high speed driving by engaging one of the friction engaging members and releasing the other friction engaging member. This hydraulic control system is capable of providing an appropriate slip driving overlap for the two friction engaging members in order to eliminate the above-described shifting shocks or abnormal wear on the friction members and to shorten the shifting time.

Another object of this invention is to provide a hydraulic control system capable of adjusting the slip driving overlap amount of the two friction engaging members in accordance with the engine output, thus appropriately decreasing the acceleration torque developed at the output shaft of a speed change gear in accordance with the engine output before the two friction engaging members begin slip driving. This provides smooth shifting to the acceleration torque that is developed at the output shaft at the completion of upshift. At this time, if the engine output is large, the amount of slip driving overlap is increased, and if the engine output is small, the amount of overlap is decreased.

A further object of this invention is to provide a hydraulic control system capable of appropriately increasing the amount of slip driving overlap for two friction engaging members at the time of an upshift and for performing a speed change with a small overlap amount at the time of a down shift. Thus, a smooth speed change also is ensured at the time of a downshift.

In transmissions comprising a variable ratio speed change gear, at least two friction engaging members and two hydraulic servos for operating each of these members, the high speed range being obtained by supplying oil to the first hydraulic servo and discharging oil from the second hydraulic servo, and low speed range being obtained by discharging oil from the first hydraulic servo and supplying oil to the second hydraulic servo. The hydraulic control system according to this invention comprises a first shift valve which is controlled by a signal that is related to the engine output and by a signal that is related to the vehicle velocity, thus supplying oil to or discharging it from the first hydraulic servo. The system further comprises a second shift valve which discharges oil from the second hydraulic servo when the hydraulic pressure existing in the first hydraulic servo exceeds a set value, but supplies oil to the second hydraulic servo when the first servo hydraulic pressure is decreased below the set value.

Furthermore, according to this invention, the second shift valve is controlled by the hydraulic pressure that exists in the first hydraulic servo and a signal that is related to the engine output. The engine output signal, moreover, also adjusts the set value of the first servo hydraulic pressure. In this case, the set value is increased due to the increase in the signal in relation to the engine output. Consequently, at the time of upshift, the oil discharge starting time of the second hydraulic servo is delayed and the overlap amount of slip driving of the two friction engaging members is increased.

Further in accordance with this invention, an accumulator for storing or conserving the hydraulic pressure that exists in the first hydraulic servo is provided in parallel with the hydraulic servo. The hydraulic pressure increase rate in the first hydraulic servo is changed by means of this accumulator, and therefore the overlap amount is adjusted.

Furthermore, according to this invention, the second shift valve also has an accumulator function. By virtue of this function, the hydraulic pressure in the pressure accumulating chamber serves as a control signal for the shift valve, thus reducing the number of component parts required.

An additional feature of this invention provides an orifice in series with the oil passage that connects the first shift valve and the first hydraulic servo. At the same time, a check valve for bypassing the discharged oil from the first hydraulic servo is provided with the orifice. At the time of upshift, the orifice is situated in the oil passage that supplies oil to the first hydraulic servo. This orifice adjusts the increase rate in hydraulic pressure at the hydraulic servo. At the time of downshift, the check valve opens and eliminates the orifice from the oil discharge passage, thus promoting rapid oil discharge and decreasing the overlap amount.

BRIEF DESCRIPTION OF THE DRAWINGS

In the drawings:

FIG. 1 is a sectional view of an example of speed change gear to which the system according to this invention is applied;

FIG. 3 is a piping diagram for the principal parts of the system shown in FIG. 2 when they are in different operating positions;

FIG. 4 is a piping diagram for the principal parts of another embodiment of the system according to this invention;

FIG. 5 is a piping diagram for the system of FIG. 4 when it is in a different operating position;

FIG. 11 is a sectional view of another embodiment of the shift valve.

DESCRIPTION OF A PREFERRED EMBODIMENT

Figure 2:
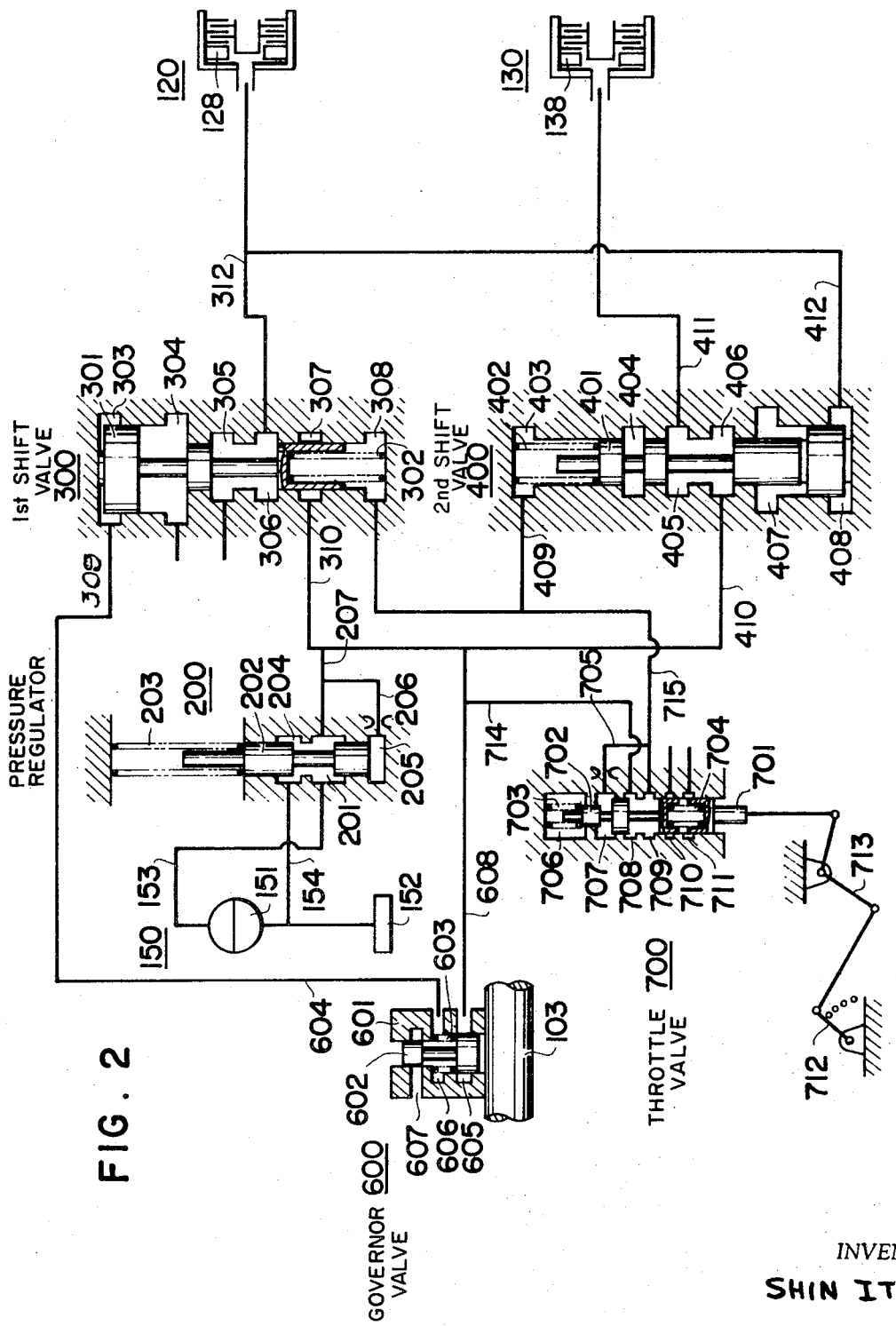
FIG. 2 is a piping diagram for the hydraulic control system according to this invention.

FIG. 1 illustrates an example of a speed change gear to which the hydraulic control system according to this invention is applied. This speed change gear is of a two-speed counter shaft type. A speed change gear 100 consists of a gear case 101, an input shaft 102 and an output shaft 103 which are coaxially disposed, an intermediate shaft 104 disposed in parallel with shafts 102 and 103, gears 110, 111, 112 and 113 and multiple disc clutches 120 and 130 provided with hydraulic servos. The shafts 102 and 103 are coaxially and rotatably coupled at their inner ends by means of a bearing 102b at the intermediate position. The outer ends thereof are supported in the case 101 by bearings 102a and 103a. The shaft 104 is supported in the case 101 at both ends thereof by means of bearings 104a and 104b.

The gears 110, 111 and 113 are firmly connected or keyed to the shafts 102, 104 and 103, respectively. The gear 112 is rotatably supported with respect to the shaft 104. The clutch 120 connects the shafts 102 and 103 and the clutch 130 connects the shaft 104 and the gear 112.

The clutches 120 and 130 are of known construction. Firstly, the clutch 120 will be described. The clutch 120 consists of a drum 121, clutch discs 122 connected to the drum, a clutch end plate 123, a hub 124, clutch discs 125 connected to hub 124 and interposed between clutch discs 122, a circular piston 126 disposed between the inner periphery of the drum 121 and the outer periphery of a drum boss 121a, a spring 127 whose one end is in contact with a stop seat 121b secured to the tip of the drum boss 121a and whose other end pushes the piston 126, and a cylinder chamber 128 formed by the drum 121 and the piston 126.

The clutch 130 is of the same construction as described above. The cylinder chamber thereof is identified by the reference numeral 138. In order to supply oil into or discharge it from cylinder chambers 128 and 138, oil pipes 141 and 142 are attached to bosses 105a and 105b of a seal plate 105 disposed at the end plane of the case 101. Axial oil passages 143 and 144 are provided on the shafts 102 and 104.

As is seen from this construction, the shaft 104 is coupled to the gear 112 by supplying oil into the cylinder chamber 138 of the clutch 130 and the shaft 102 is coupled to the shaft 103 by supplying oil into the cylinder chamber 128 of the clutch 120. Therefore, if the oil is discharged from the cylinder chamber 128 while the oil is being supplied into the cylinder chamber 138, the input shaft 102 is coupled to the output shaft 103 through the gears 110, 111, 112 and 113, thus obtaining the low speed range having a certain change gear ratio. If the oil is supplied into the cylinder chamber 128 while the oil is being discharged from the cylinder chamber 138, the input shaft 102 is directly coupled to the output shaft 103, thus obtaining the high speed range. Shift from low speed to high speed is called upshift and shift from high speed to low speed is called downshift.

Figure 8:
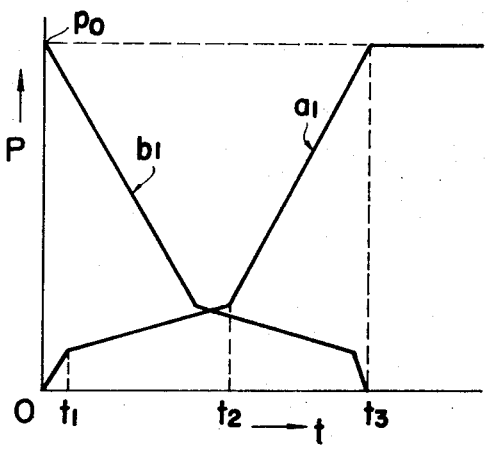
FIG. 8 is a graph illustrating the time variation of the hydraulic pressure in conventional systems.

In conventional speed change gears of the type described above, the engagement of the clutch 120 by supplying oil into the cylinder chamber 128 at the time of upshift is accomplished concurrently with the disengagement of the clutch 130 by discharging oil from the cylinder chamber 138. In this case, the hydraulic pressures in the cylinder chambers 128 and 138 vary as shown in FIG. 8. That is, the hydraulic pressure in the cylinder chamber 128 into which the oil is supplied is changed as shown by the curve $a_1$. This hydraulic pressure is not immediately increased due to the line resistance in the oil passage, and the like, even if the hydraulic pressure having the pressure Po is supplied. During the period of time between zero and $t_1$, the piston 126 is pressed to one side of the drum 121 by means of the spring 127 and the oil flows under pressure into the cylinder chamber 128, which has a minimum capacity at that time, thus causing the pressure to increase gradually. During the period between $t_1$ and $t_2$, the hydraulic pressure in the cylinder chamber 128 pushes the piston 126, overcoming the pressure applied by the spring 127, until the clutch discs 122 and 125 are pressed against the end plate 123. During the above-described period, the hydraulic pressure slightly increases as the capacity of the cylinder chamber 128 increases. At the time $t_2$, when the piston 126 presses the clutch discs 122 and 125 and cannot move any more, the hydraulic pressure suddenly increases until it reaches the oil source pressure Po at the time $t_3$.

On the other hand, in the cylinder chamber 138 of the clutch 130 to which the pressure Po is being applied, the hydraulic pressure is changed as shown by the curve $b_1$. This pressure decreases sharply at the initial stage. The decrease of the curve $b_1$ takes place in the reverse time relationship with respect to the increase of the curve $a_1$. As is seen from FIG. 8, the hydraulic pressure in the cylinder chamber 138 (FIG. 1) decreases before the hydraulic pressure in the cylinder chamber 128 is fully increased, during which time the engaging force of both clutches is small. As a result, the engine is brought into no-load condition and the shaft speed increases. Consequently, when the input shaft 102 is to be directly coupled with the output shaft 103 as the result of increase in the engaging force of the clutch 120, the difference in the speeds of both shafts becomes great, thus resulting in shifting shocks.

In order to eliminate the above-described shortcomings, the oil discharge starting time at the clutch 130 should be delayed with respect to the oil supply starting time at the clutch 120 so that two clutches can form a range where they provide slip driving with a large engaging force.

Illustrated in FIG. 2 is the hydraulic control system according to this invention, which attains the above requirement. This hydraulic control system consists of a hydraulic pressure source 150, a pressure regulator valve 200, a governor valve 600, a throttle valve 700, a first shift valve 300 and a second shift valve 400. The hydraulic pressure source 150 comprises an oil pump 151, an oil tank 152, a supply pipe 153 and an oil return pipe 154. The hydraulic pressure developed in the discharge pipe 153 is converted to a constant hydraulic control pressure by means of the pressure regulator valve 200.

The pressure regulator valve 200 consists of an oil chamber 201, a valve body 202, a pressure adjusting spring 203, oil chambers 204 and 205 and a communication oil passage 206. The hydraulic pressure in the oil chamber 201 is controlled so that the upward hydraulic pressure acting on the valve body 202 in the oil chamber 205 is balanced with the force of the spring 203. Thus, the hydraulic control pressure regulated to a predetermined pressure is obtained in an output oil passage 207. This hydraulic control pressure is directed to each valve through oil passages 310, 410, 608 and 714.

The governor valve 600 consists of a valve casing 601 which rotates integrally with the output shaft 103, a valve body 602 which is moved in the radial direction by centrifugal force, a bias spring 603, oil chambers 605 and 606 and an oil discharge chamber 607. The regulated hydraulic control pressure directed from the oil passage 608 into the oil chamber 605 is converted to a hydraulic pressure proportional to the speed of the output shaft 103 or the vehicle velocity (to be referred to as "governor pressure" hereinafter) by means of the governor valve 600. This governor pressure is obtained at an output oil passage 604.

The throttle valve 700 consists of a plug 701, a valve body 702, a bias spring 703, a change spring 704, a communication oil passage 705 and oil chambers 706 and 711. The plug 701 is moved by an accelerator pedal 712 through a linkage 713. In the valve body 702, the sum of the downward hydraulic pressure in an oil chamber 707 and the force of the spring 703 is opposed to the force of the spring 704 that is compressed by the plug 701. Thus, the valve body 702 is moved so that both forces are equalized or balanced. The hydraulic pressure proportional to the throttle opening or engine output (to be referred to as "throttle pressure" hereinafter) is obtained at an output oil passage 715.

The first shift valve 300 and the second shift valve 400 are provided in order to change speeds through slip driving of the clutches 120 and 130 with an appropriate overlap amount. The first shift valve 300 consists of a valve body 301, a bias spring 302, oil chambers 303, 306, 307 and 308 and oil discharge chambers 304 and 305. The governor pressure is directed through the oil passages 604 and 309 into the oil chamber 303, and the throttle pressure is directed through an oil passages 715 and 311 into the oil chamber 308. The spring 302 deflects the valve body 301 upward and the oil chamber 307 is shut off from the oil chamber 306. Under this condition, the regulated hydraulic control pressure directed through an oil passage 310 into the oil chamber 307 is not directed into an oil passage 312. Oil passage 312 is in communication with the cylinder chamber 128 of the clutch 120.

The second shift valve 400 consists of a valve body 401, a bias spring 402, oil chambers 403, 405, 406 and 408 and oil discharge chambers 404 and 407. The spring 402 deflects the valve body 401 downward and brings the oil chamber 405 into communication with the oil chamber 406. The throttle pressure is directed through an oil passage 409 into the oil chamber 403. The oil chamber 408 is connected through an oil passage 412 to the oil passage 312 which is in communication with the First shift valve 300. The regulated hydraulic control pressure is directed through an oil passage 410 into the oil chamber 406. This regulated hydraulic control pressure is then supplied through the oil chamber 405 and an oil passage 411 into the cylinder chamber 138 of the clutch 130 when the valve body 401 is in the illustrated position.

The first shift valve 300 is operated by the governor pressure in the oil chamber 303 and the throttle pressure in the oil chamber 308. When the force developed by the governor pressure for pushing the valve body 301 downward is smaller than the sum of the force of the spring 302 and the force developed by the throttle pressure for pushing the valve body 301 upward, the valve body 301 is in the condition shown in FIG. 2 and shuts off the supply of hydraulic control pressure into the oil passage 312. Consequently, the clutch 120 is in the released condition. The second shift valve 400 directs the hydraulic control pressure into the oil passage 411 and then supplies it into the cylinder chamber 138 of the clutch 130, thus holding the clutch 130 in engagement. Therefore, the speed change gear 100 shown in FIG. 1 is being operated in the low speed range.

When the force developed by the governor pressure for pushing the valve body 301 downward becomes larger than the sum of the force of the spring 302 and the force developed by the throttle pressure for pushing the valve body 301 upward, the valve body 301 is moved downward, thus bringing the oil chamber 306 into communication with the oil chamber 307. This condition is shown in FIG. 3. The regulated hydraulic control pressure directed into the oil passage 312 is directed into the cylinder chamber 128 of the clutch 120 as well as into the oil chamber 408 of the second shift valve 400 through the oil passage 412. The hydraulic pressure in the oil chamber 408 is taken out through the oil passage 412 at a point near the cylinder chamber 128 of the clutch 120, and therefore it becomes almost equal to the hydraulic pressure in the cylinder chamber 128.

Figure 6:
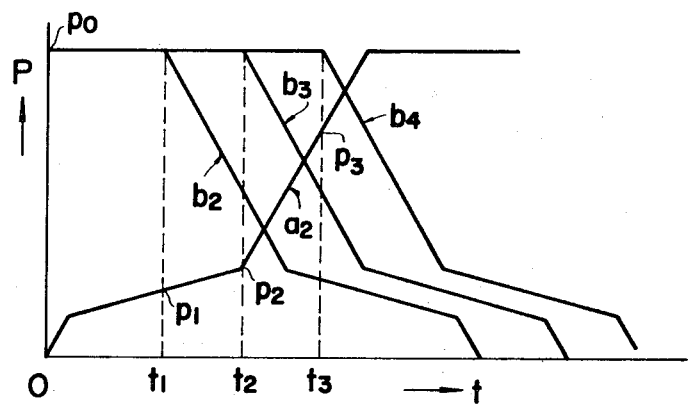
FIGS. 6 and 7 are graphs illustrating the time variation of the hydraulic pressures in the hydraulic servos which characterize the system shown in FIG. 2.

When the regulated hydraulic control pressure is directed through the oil passage 312 into the cylinder chamber 128, the hydraulic pressure in the cylinder chamber 128 is changed as shown by the curve $a_2$ in FIG. 6. This curve is identical with the curve $a_1$ which has been already described with reference to FIG. 8. The hydraulic pressure that changes as described above is directed into the oil chamber 408 of the second shift valve 400 and pushes the valve body 401 upward. In addition, the downward pushing force developed by the spring 402 and the throttle pressure in the oil chamber 403 is acting on the valve body 401. When the force developed by the hydraulic pressure of the oil chamber 408 becomes larger than the sum of the force of the spring 402 and the force developed by the throttle pressure in the oil chamber 403, the valve body 401 is moved upward. As a result, the communication between the oil chambers 405 and 406 is shut off and the oil chamber 405 is brought into communication with the oil discharge chamber 404. This time point is the oil discharge starting time of the cylinder chamber 138 of the clutch 130. This point is shown by $t_1$ in FIG. 6 when the throttle pressure is of a certain value. The hydraulic pressure in the cylinder chamber 128 at this time is indicated by $P_1$. The changes in the hydraulic pressure in the cylinder chamber 138 due to oil discharge are shown by the curve $b_2$. When the throttle pressure increases, the hydraulic pressure in the oil chamber 408 for pushing the valve body 401 upward should be higher. The oil discharge starting time is changed, for example, to $t_2$ or $t_3$ when the hydraulic pressure in the cylinder chamber 128 becomes $P_2$ or $P_3$. Therefore, the hydraulic pressure is changed along the curve $b_3$ or $b_4$. Thus, the oil discharge starting time at the clutch 130 is adjusted in accordance with the throttle pressure, i.e., engine output, and the overlap amount in the slip range in two clutches takes a desired value.

Figure 7:
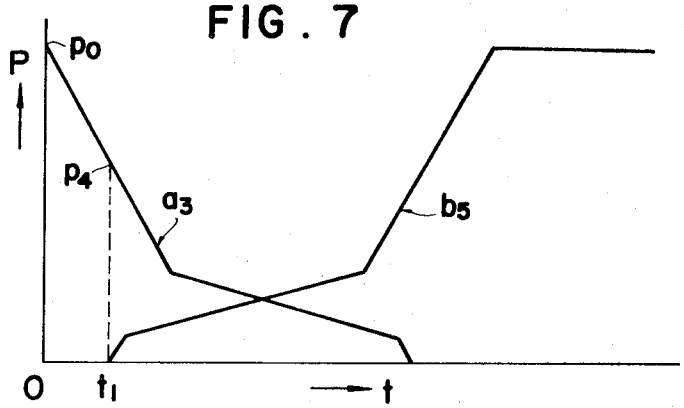

The above description relates to the changes in the hydraulic pressure in each cylinder chamber at the time of upshift. In the case of downshift, the hydraulic pressure in each cylinder chamber is changed as shown in FIG. 7. The curve $a_3$ indicates the pressure discharge characteristic in the cylinder chamber 128 and the curve $b_5$ indicates the pressure application characteristic in the cylinder chamber 138. When the valve body 301 of the first shift valve 300 is brought into the condition of FIG. 2 again, the hydraulic pressure in the cylinder chamber 128 is changed in accordance with the curve $a_3$. When this hydraulic pressure reaches $P_4$ at the time $t_1$, the second shift valve 400 is returned to the condition of FIG. 2. The supply of the hydraulic pressure into the cylinder chamber 138 is started from this time $t_1$ and this hydraulic pressure changes along the curve $b_5$. The pressure application starting time $t_1$ for the cylinder chamber 138 is changed in accordance with the magnitude of the throttle pressure to be applied to the oil chamber 403. In this case, the higher the throttle pressure, the sooner the pressure application starts. This characteristic is also desirable for clutch operation in the case of downshift.

At the earlier stage of oil discharge and at the later stage of pressure application, a sudden change in the hydraulic pressure in the cylinder chambers of the clutches is observed.

In particular, it is necessary to avoid a sudden change in pressure in order to absorb a shock during a speed change. This is possible by the use of an accumulator. In this case, too, the overlap previusly mentioned is necessary. In this embodiment, a second shift valve 500 having a different construction from that of the shift valve 400 of FIG. 2 is employed. The second shift valve 500 consists of a valve body 501 having a land of large cross sectional area on the top thereof, a bias spring 502, oil chambers 503, 505, 506, 507 and an oil discharge chamber 504. The oil chamber 503 is brought into communication with the oil passage 312 through an oil passage 512. The oil chamber 505 is brought into communication with the cylinder chamber 138 of the clutch 130 through an oil passage 511. The regulated hydraulic control pressure is directed through an oil passage 510 into the oil chamber 506. The throttle pressure is directed through an oil passage 509 into the oil chamber 507. In FIG. 4, an orifice 313 is placed in series with the conduit or oil passage 312 at a point toward the first shift valve 300 from the connection point of the oil passage 312 with the oil passage 512. A check valve 314 is connected in parallel with the orifice 313 in the direction of the flow of discharged oil from the cylinder chamber of the clutch 120.

The condition of the valve body 301 of the first shift valve 300 corresponds to that shown in FIG. 2. Communication between the oil chambers 306 and 307 is shut off and there exists no hydraulic pressure in the oil passage 312. Therefore, there exists no hydraulic pressure in the oil chamber 503 of the second shift valve 500 and the valve body 501 is being pushed upward by the spring 502 and the throttle pressure. Under this condition, the oil passage 505 is brought into communication with the oil passage 506 and the regulated hydraulic control pressure is directed into the cylinder chamber 138 of the clutch 130, thus holding the clutch 130 in engagement. The speed change gear 100 (FIG. 1) is in the low speed range.

Figure 9:
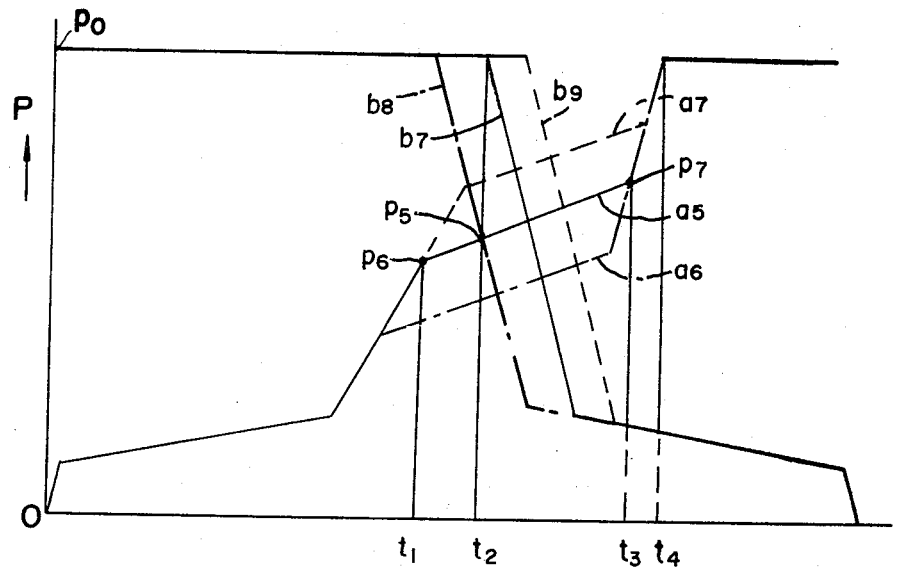
FIGS. 9 and 10 are graphs illustrating the time variation of the hydraulic pressure obtained in the system that is shown in FIG. 4.

When the valve body 301 of the first shift valve 300 is moved downward by the governor pressure in the oil chamber 303, the hydraulic pressure is directed into the oil passage 312 in the same manner as described above. Shown in FIG. 5 is the first shift valve 300 under the above-described condition. In this case, the changes in the hydraulic pressure in the cylinder chamber 128 of the clutch 120 are shown by the curve $a_5$ in FIG. 9. This hydraulic pressure is changed in the almost same manner as in the curve $a_2$ of FIG. 6 during the period from the time 0 to the time $t_1$. When the hydraulic pressure in the cylinder chamber 128 reaches the pressure $P_6$ at the time $t_1$, the valve body 501 starts to move downward as the force developed by the hydraulic pressure having the pressure $P_6$ in the oil chamber 503 becomes larger than the upward force developed by the spring 502 and the throttle pressure in the oil chamber 507. The amount of oil flowing into the oil chamber 503 with the change in the capacity of the oil chamber 503 is larger than the amount of oil flowing into the cylinder chamber 128 of the clutch 120, and therefore the hydraulic pressure in the oil passage on the right side of the orifice 313 is regulated to be equal with that in the oil chamber 503. The characteristic of the hydraulic pressure in the oil chamber 503 is regulated in accordance with the characteristic of the spring 502, the cross sectional area of the oil chamber 503 and the like, and therefore it is possible to obtain a characteristic as illustrated which is increased with a comparatively gentle gradient during the period between $t_1$ and $t_3$. Therefore, the oil chamber 503 constitutes an accumulator chamber.

When the hydraulic pressure in the oil chamber 503 reaches $P_5$ at the time $t_2$, the valve body 501 starts to bring the oil chamber 505 into communication with the oil discharge chamber 504, thus discharging the hydraulic pressure from the cylinder chamber 138 of the clutch 130. From this time on, the hydraulic pressure in the cylinder chamber 138 decreases along the curve $b_7$. In the shift valve 500, too, the accumulator function of the oil chamber 503 is changed, because the throttle pressure is being directed into the oil chamber 507. If the throttle pressure is low, the hydraulic pressure in the oil chamber 503 is changed as shown by the curve $a_6$. If the throttle pressure is high, the hydraulic pressure follows the curve $a_7$. In accordance with these changes, the time $t_2$ of starting of movement of valve body 501 changes, and the hydraulic characteristic of the clutch 130 changes as shown by the curves $b_8$ and $b_9$.

On the curve $a_5$, when the hydraulic pressure in the oil chamber 503 reaches $P_7$ at the time $t_3$, the valve body 501 of the shift valve 500 is at the lowermost position and does not move any more. Therefore, during the time period between $t_3$ and $t_4$, the hydraulic pressure is controlled by the change in the hydraulic pressure in the cylinder chamber 128 of the clutch 120.

As described above, in the embodiment of FIG. 4, the rate of increase of the hydraulic pressure during the pressure application process of the clutch 120 is adjusted by providing the accumulator function to the oil chamber 503 of the second shift valve 500. In some cases, it is possible to adjust the increase rate of the hydraulic pressure during the pressure application process by attaching an accumulator to the system shown in FIG. 2 in addition to the second shift valve 400.

Figure 10:
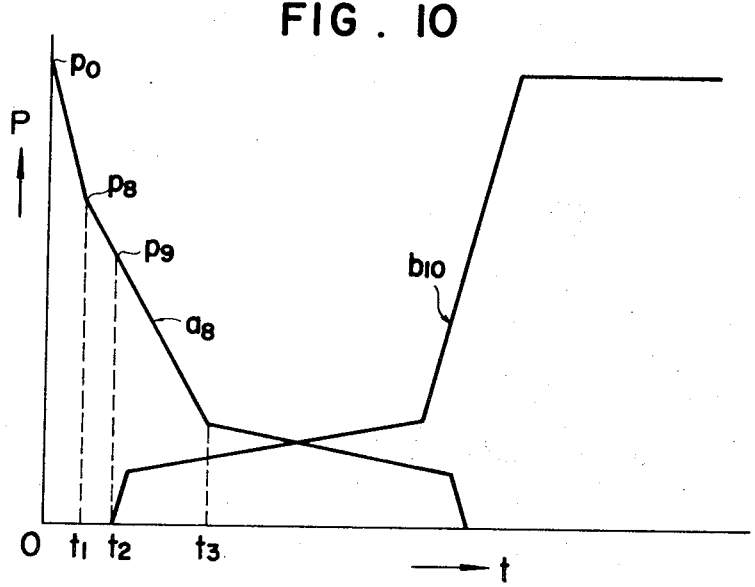

At the time of downshift from the high speed running in FIG. 5 to the low speed running in FIG. 4, the first shift valve 300 is brought into the condition of FIG. 4 and the discharge of the hydraulic pressure in the cylinder chamber 128 of the clutch 120 is started. This condition is shown by the curve $a_8$ in FIG. 10. After the hydraulic pressure reaches $P_8$ at the time $t_1$, the hydraulic pressure is decreased with a gentle gradient until the time $t_3$ by means of the accumulator function of the shift valve 500. When the hydraulic pressure reaches $P_9$ at the time $t_2$ during the decreasing process, the oil chamber 505 is brought into communication with the oil chamber 506, and the pressure application to the clutch 130 is started. This characteristic is shown by the curve $b_{10}$. As is apparent from FIG. 10, the overlap amount of the ranges of hydraulic pressure changes in two clutches is small in the case of downshift. In the system shown in FIG. 4, the orifice 313 and the check valve 314 are provided on the oil passage 312. The orifice 313 serves to check the increase rate of the hydraulic pressure during the pressure application process of the clutch 120. The check valve serves to enlarge the pressure decrease rate during the pressure discharge process from the clutch. Thus, two clutches transmit only a small torque at the time of downshift and a time zone where the clutches are freely slip-driven is developed. During this period, the engine is accelerated under no-load condition and a smooth speed change is accomplished.

According to the hydraulic control system of this invention, the first shift valve opens and closes at predetermined shifting points by means of a signal that is related to the vehicle velocity and a signal that is related to the engine output and accomplishes the clutch pressure application and discharge in the high speed range in order to engage and release the clutch. At the same time, the second shift valve is controlled by the hydraulic pressure in the cylinder chamber of the clutch in the high speed range and is put into operation with an appropriate delay from the start of the operation of the first shift valve. Thus, the engagement and the release of the clutch in the low speed range is delayed. Particularly, slip driving is accomplished to provide smooth speed change when two clutches are in the condition where they can transmit a large torque at the time of upshift. The delay time of the clutch in the low speed range in changed in response to the engine output by directing the signal conforming to the engine output to the second shift valve. If the engine output is large, the engaging force of the clutch in the high speed range is increased at the time of the start of release of the clutch in the low speed range, thus attaining smooth speed change and minimizing wear of the clutch friction members.

It is possible to control the first shift valve 300 by means of a shifting signal obtained from electrical signals instead of the governor pressure and throttle pressure. An example of such system is shown in FIG. 11. An electromagnetic solenoid 320 and an armature 321 are provided for operating the valve body 301. The oil chambers 303 and 304 provided in the embodiment of FIG. 2 are omitted, and the oil chamber 308 serves as an oil discharging chamber. The electromagnetic solenoid 320 is excited by an electrical shifting signal and causes the valve body 301 to move upward or downward through the armature 321. In this embodiment, parts corresponding to those in FIG. 2 are identified by the same reference numerals.

In the above-described embodiment, the hydraulic control system of this invention is applied to countershaft type two speed change gears. It is apparent, however, that this system can be applied to three or more speed change gears or planetary change gears.

What is claimed is

1. In a transmission, for an automotive vehicle engine, including a variable ratio speed change gear, at least two friction engaging members and respective hydraulic servos for operating the members, and in which a first speed range is obtained by supplying oil under pressure to a first hydraulic servo and discharging oil from a second hydraulic servo, and a second speed range is obtained by supplying oil under pressure to the second hydraulic servo and discharging oil from the first hydraulic servo: a hydraulic control system comprising, in combination, a source of oil at a control pressure; first flow control means connected to said source; first passage means connecting said first control means to said first hydraulic servo; means subjecting said first control means to a first operating force in accordance with the engine output and to an opposing second operating force in accordance with the vehicle velocity, said first control means connecting said first passage means to said source or to discharge in accordance with the relative magnitudes of said first and second operating forces; a second flow control means connected to said source; second passage means connecting said second flow control means to said second hydraulic servo; and further passage means connecting said second flow control means to said first hydraulic servo and subjecting said second flow control means to the hydraulic pressure effective on said first hydraulic servo; said second flow control means connecting said second passage means to discharge when the hydraulic pressure in said first hydraulic servo exceeds a set value, and connecting said second passage means to said source when the hydraulic pressure in said first hydraulic servo decreases below said set value.

2. A hydraulic control system, as claimed in claim 1, including means subjecting said second shift valve to said first operating force in opposition to the hydraulic pressure effective on said first hydraulic servo; said set value being controlled by said first operating force.

3. A hydraulic control system, as claimed in claim 1, including an accumulator in communication with said first hydraulic servo and accumulating the hydraulic pressure effective on said first hydraulic servo.

4. A hydraulic control system, as claimed in claim 3, in which said second flow control means includes said accumulator.

5. A hydraulic control system, as claimed in claim 1, including an orifice in said first passage means restricting flow of oil to said first shift valve; and a check valve connected to said first passage means in by-passing relation with said orifice and providing for unrestricted discharge of oil from said first hydraulic servo.

6. A hydraulic control system, as claimed in claim 1, including a pressure regulator constituting said source of oil at a control pressure; said first and second flow control means comprising first and second shift valves, respectively; said means subjecting said first shift valve to a first operating force in accordance with the engine output comprising a throttle responsive valve connected to said pressure regulator and a conduit connecting said throttle responsive valve to said first shift valve; said means subjecting said first shift valve to an opposing second operating force in accordance with the vehicle velocity comprising a governor valve connected to said pressure regulator and a conduit connecting said governor valve to said first shift valve; said means subjecting said second shift valve to said first operating force comprising a conduit connecting said second shift valve to said throttle responsive valve and applying the throttle pressure to said second shift valve in opposition to the hydraulic pressure effective on said first hydraulic servo.

7. A hydraulic control system, as claimed in claim 6, in which said second shift valve includes a hydraulic accumulator in communication with said first hydraulic servo and operable to effect a gradual increase in the hydraulic pressure effective on said first hydraulic servo.

8. A hydraulic control system, as claimed in claim 7, including an orifice in said first passage means restricting flow of oil to said first hydraulic servo and to said accumulator to retard the rate of pressure increase; and a check valve connected to said first passage means in by-passing relation with said orifice and providing for unrestricted discharge of oil from said first hydraulic servo to accelerate the rate of pressure decrease in said first hydraulic servo and in said accumulator.

9. A hydraulic control system, as claimed in claim 1, in which said first and second flow control means comprise first and second shift valves, respectively; said means subjecting said first shift valve to a first operating force in accordance with the engine output and to an opposing second operating force in accordance with the vehicle velocity comprising electromagnetic means operatively associated with said first shift valve; and means applying, to said electromagnetic means, electrical signals corresponding to the engine output and the vehicle velocity.

* * * * *